Sept. 2, 1941.  D. BOYD ET AL  2,254,415

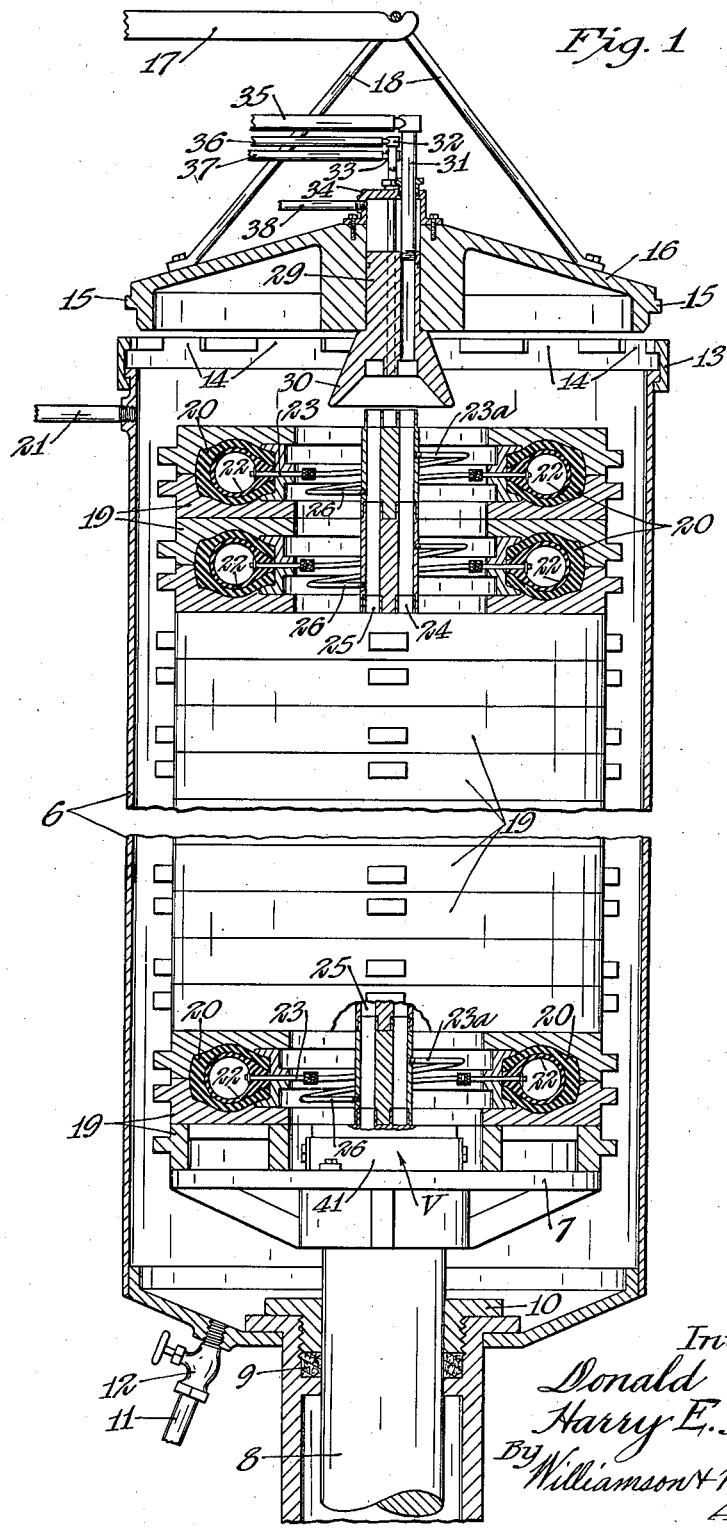

TIRE COOKER

Filed June 30, 1939  2 Sheets-Sheet 2

Inventors
Donald Boyd
Harry E. Fenner
By Williamson & Williamson
Attorneys

Patented Sept. 2, 1941

2,254,415

UNITED STATES PATENT OFFICE 2,254,415

TIRE COOKER

Donald Boyd and Harry E. Fenner, Eau Claire, Wis.

Application June 30, 1939, Serial No. 282,048

10 Claims. (Cl. 18—17)

This invention relates to apparatus principally adapted for the vulcanization of vehicle tire casings.

Tire casings are initially formed by combining green or unvulcanized rubber with the fabric or coat of the casing, and after formation thereof the casings are cooked or vulcanized by placing them in molds which in turn are placed in a cooker pot, applying heat to the outside of the molds and admitting hot water under pressure to the interior of the casing either directly or into so called water bags which are placed within the casings. There are several variations of the general method of vulcanizing casings and there are numerous types of apparatus for accomplishing this treatment.

One great disadvantage of the present vulcanizing treatment is that frequently the hot water is not sufficiently removed from the interior of the casing or water bag at the termination of the vulcanizing operation and when the mold is removed from the exterior of the casing the water bag will explode. The explosion takes place due to the fact that the hot water remaining in the casing or bag is under a pressure many times greater than normal atmospheric pressure. Naturally such an explosion is a considerable hazard in the tire factory, and it occurs so frequently that it is a constant source of danger. The failure to accomplish removal of all of the water from the interior of the casing is due principally to the fact that small particles of rubber frequently block the drain outlets and the water cannot escape, the interior pressure thereby being maintained. This is particularly prevalent where water bags are placed in the casing. These bags are made of rubber and quickly deteriorate due to their exposure to the highly heated water.

Several methods of exhausting water from the interiors of the tire casings have been developed and one of the commonly used methods is a vacuum or suction method, but the apparatus for producing this suction is expensive and it has been found that sufficient suction cannot be practically created to insure removal of water from the casings' interiors, with the result that the water outlets become clogged and explosions result. This is particularly true with the multiple cookers.

It is, therefore, an object of our invention to provide tire casing vulcanizing apparatus which includes means for positively effecting exhausting of water from the casing interiors after the vulcanizing operation before the molds are removed from the cooker pot. While we are particularly directing the following detailed description to means for exhausting water from the bags under positive pressures, it is, of course, possible that some suitably derived negative pressures might be utilized for the evacuation of water.

Another object of the invention is to provide valve means for controlling the drainage of water from the casing interiors which can be placed within a cooker pot containing a plurality of casing molds, said valve having controlling means located outside of said cooker pot to permit removal of water from the interiors of the casings before the cooker pot is opened to remove and open the casing molds.

Another object of the invention is to provide means for quickly and easily connecting a hot water supply pipe to the casings within the molds in the cooker pot.

A further object of the invention is to provide means for creating constant circulation of hot water in the tire molds.

These and other objects and advantages of the invention will more fully appear from the following description made in connection with the accompanying drawings, wherein like reference characters refer to the same parts throughout the views, and, in which:

Fig. 1 is a vertical sectional view through a cooker pot showing several individual casing molds in vertical section;

Figure 3:
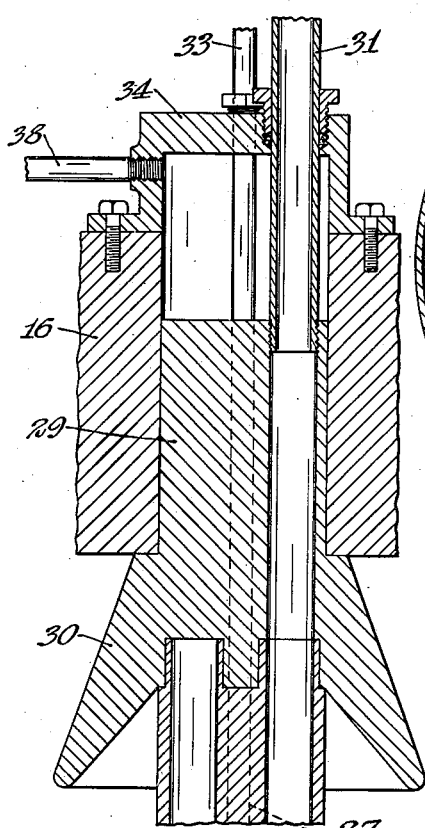
Fig. 3 is a fragmentary view in vertical section showing the control valve and a portion of the upper end of the cooker with the hot water inlet connection.

In Fig. 1 there is shown a tire cooker pot 6 within which is a substantially circular deck commonly called a spider 7 on a movable piston or ram 8. The ram extends up through the bottom of the pot and is movable by suitable fluid pressure means from the bottom to the top of said pot. Suitable packing 9 and a packing gland 10 prevent the escape of fluid pressure from the interior of the pot 6. The bottom of the pot is provided with a drain pipe 11 which may be opened or closed by a suitable valve 12. The upper end of the pot is provided with a rotatable ring 13 having notches 14 to receive lugs 15 on the pot top 16. The top is connected to the main body of the pot by this ring and notch connection. The top may be removed by any suitable means such as a lever or crane 17 which connects with a hanger 18 on the top.

A plurality of tire molds 19 are adapted to be placed in the pot in stacked relationship, said molds being supported upon the ram deck or spider 7. When molds are first placed within the pot, the ram deck or spider is elevated to the top of the pot and is gradually lowered as additional molds are placed thereupon. The molds 19 are divided as shown in the drawings, and each mold is adapted to receive a vehicle tire casing 20. The outer surface of the casing rather closely fits the interior of the mold. A steam inlet pipe 21 is adapted to supply steam to the interior of the cooker pot to heat the outside of the casing molds.

Figure 2:
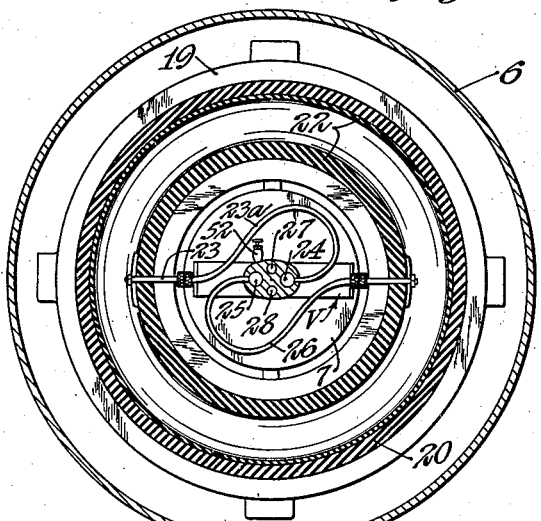
Fig. 2 is a horizontal section through the cooker pot and a casing mold showing the inlet and drain conduits and drain control valves.
Figure 4:
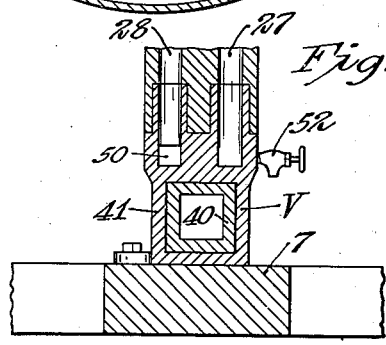
Fig. 4 is a transverse section through the control valve showing the lower ends of the inlet and drain conduits.
Figure 5:
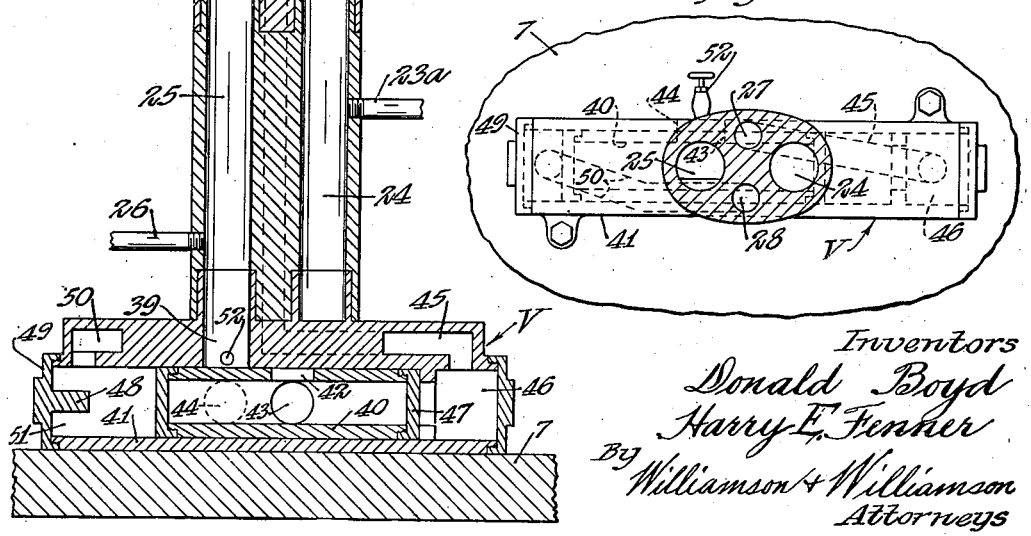
Fig. 5 is a plan view of the control valve.

In the illustrated embodiment of our invention the casings 20 have rubber water bags 22 placed in them, these water bags being shaped generally similar to the well known inner tube. Each of the water bags is provided with a water inlet stem 23 which is connected by a piece of tubing 23a to a water inlet conduit 24. As best shown in Fig. 2, the tubing between the inlet conduit and the inlet nozzle is rather long and flexible so that connection can be made with different sizes of casings.

The inlet conduit 24 is combined with several other conduits to be described later and all of these conduits commonly called connections are formed in short units as best indicated in Figs. 1 and 3, each of the units or sections being of a length about equal to the thickness of a mold and each mold having one of these units. As best indicated in Fig. 3, these conduit sections have reduced upper ends to slidably receive the enlarged lower ends of the sections placed upon them. If preferred the joints between the sections may be slightly tapered to make a tighter fit, but they are not positively connected since such a connection would consume too much time when inserting molds into or removing molds from the cooker. The conduit 25 which is formed in the plurality of sections just described is a drain conduit and is connected by tubes 26 to drain the water bags in the tire casings. The conduits 27 and 28 which are also formed in the stacked sections are steam or air supply conduits which lead to a control valve to be described below.

The several sections or connections which comprise conduits 24, 25, 27 and 28 are stacked one upon the other with the addition of molds until the cooker pot 6 is filled or until any desired number of molds is placed in the pot and the uppermost mold is positioned adjacent the top of the pot as indicated in Fig. 1. The cooker top 16 is then fastened in position to tightly close the pot and connection is then made from the exterior of the pot with the hot water inlet conduit 24 and the valve control conduits 27 and 28. A piston 29 is mounted for vertical sliding movement in a cylinder formed through the center of the cooker top 16 and the lower end of this piston is flared outwardly to provide what is termed a bell 30. The bell and the piston 29 are provided with conduits which are adapted to register with the inlet conduit 24 and the valve control conduits 27 and 28. The valve fits down over the uppermost sections of these conduits in the same manner as the conduit sections are stacked upon each other. The conduits in the bell are connected to pipes 31, 32, and 33 which extend through a cylinder head 34 in slidable relation thereto. These pipes are connected in turn to flexible tubes 35, 36, and 37. The piston 29 is moved downwardly against the upper conduit section by fluid pressure injected into the cylinder above the piston through a steam or air conduit 38.

The conduit section accompanying the lowermost mold is adapted to fit upon suitably formed connections on the upper side of the casing of a control valve V. The drain conduit 25 is connected to the interior of the valve through a passageway 39 and this passageway is adapted to communicate with the interior of the piston 40 when said piston is moved to the left-hand end of the cylinder 41 bringing the upper opening 42 in alignment with the passage 39. When the piston is in the left-hand position the side opening 43 will register with an opening 44 in the casing or cylinder 41. Water can then drain from the drain conduit 25 through the piston valve and out into the bottom of the cooker pot 6. From this point the water drains out of the drain pipe 11 which is preferably open to normal atmospheric pressures during the draining. Actuation of the piston valve 40 is accomplished by fluid pressure, either steam or compressed air being provided since they are available in the tire factory. Fluid under pressure is admitted through conduit 27 and it enters the valve V through a passageway 45 and thence into a steam chest 46. Pressure exerted against the piston end 47 causes the same to move to the left until the same comes into contact with a stop 48 on a cap 49 on the left-hand end of the cylinder or housing 41. Movement of the valve in the opposite direction is accomplished by directing fluid pressure through the conduit 28 and passageway 50 in the valve housing to the steam chest 51 at the left-hand end of the cylinder. Of course, the pressure fluid will force the piston back to the right, thus shutting off the drain conduit 25.

When the cooker pot has been loaded and the top fastened in position the bell 30 is moved downwardly on the group of conduit sections to provide connection between the exterior conduits and those within the cooker. Hot water is directed into the water bags 22 filling all of said bags. Steam is admitted into the interior of the cooker through the cooker inlet stem 21, and the casings are thus subjected to heat both inside and outside. During the vulcanizing operation there will be circulation of hot water throughout the molds due to the position and operation of the bleeder opening or seepage valve 52 and an even distribution of heat is provided. After vulcanization of the casings during which time the control valve piston 40 is in the closed position shown in Fig. 3, said valve is then moved to the left-hand end of the cylinder to open up the lower end of the drain conduit 25. In many cases most of the water will naturally exhaust itself from the water bags in the casings, but even then it is extremely desirable and necessary to properly evacuate the bags by admitting steam or compressed air into the water inlet conduit and through the casings under considerable pressure to positively assure proper drainage or exhaustion of water from the water bags. Sufficient pressures can be exerted to positively force any particles of rubber which might come from the interiors of the bags through the drain conduit and control valve and thence out into the cooker pot 6 from where the particles drain with the water through the comparatively large cooker drain pipe 11. The steam inlet 21 which admits steam into the cooker for the purpose of heating the outside of the molds, is left open during the curing process, and closed before drainage of the water bags.

The cooker pot is opened by the following operations: (a) Unlocking the rotatable ring 13 by removing the key, and turning same to disengage the lugs 15, so that they will pass through notches or openings 14. (b) Raising the stack of molds, together with the cooker pot cover, by means of the ram 8, to a height sufficient to enable the operator to engage the metal hanger 18 into the hook, lever or crane 17. (c) Lowering the stack of molds by means of the ram 8, leaving the cover 16 hanging on the crane 17, by which said cover 16 is swung around out of the way. The bell 30 remains with the cover 16. (d) The stack of molds is then lowered, by means of the ram 8, to an elevation which will leave one mold exposed so that it can be kicked off on to the deck of a table or runway, and passed along for opening. The stack of molds is then raised another step, another mold is kicked off, the operation being repeated until all of the molds are removed from the cooker.

It should be noted that the conduit sections are identical in structure and need not be placed in any particular order, and the conduit connections on the upper side of the casing of valve V as well as the sockets in the bell 30 are such that they will receive the lower ends and upper ends respectively of any of the duplicate conduit sections.

It can readily be seen that our apparatus, while just as simple to operate as types heretofore used, is one which will positively exhaust all water from the bags in the casings, so that the outward pressure of the water in the bags will not cause an explosion when the cover of the mold is removed and the outside pressure released to normal atmospheric pressure. The absolute removal of practically all liquid from the water bags entirely eliminates any danger of explosion in the apparatus. The valve structure is secured to the deck or spider on the upper end of the plunger or ram 8 and the valve casing may be surrounded by a dummy mold to provide support for the stack of casing molds. The use of a dummy mold is not a waste of space in the cooker since it is common practice to leave the bottom mold empty when curing casings in the cooker. The valve is thus located at a convenient point adjacent the lower end of the drain conduit and it is operated at any desirable point outside of the cooker merely by manipulating suitable valves to flow fluid pressure through either of conduits 27 or 28 depending upon the direction in which the piston is to be moved.

Some types of apparatus provide for removal of liquids from water bags merely by opening a conduit and letting the pressure created by the steam inside of the water bags push the water out of the apparatus. While considerable pressures may be built up by the flashing of residual water into steam, these pressures are frequently insufficient to force particles of rubber out of the water bags through the small openings and explosions result. Some types of apparatus exhaust water out of the top of a pot by the suction or vacuum method and it is naturally much more difficult to remove water in any manner wherein it has to be lifted.

We have provided a top connection which makes it a very simple matter to connect the supply conduits on the outside of the cooker with the stack of conduits on the inside and these sections are held tightly together by the maintenance of steam pressure on the upper side of the bell piston 29 and consequently there is no chance of leakage at the joints between the sections.

One important feature to remember in connection with the invention is the provision of four different pipes, two of which provide the fluid inlet and outlet connections within the cooker pot, and the other two of which provide the fluid supply conduits for controlling the valve V within the cooker while it is completely sealed. The double connection providing inflow and outflow to and from the various molds eliminates the need for two-way flow through one conduit as is utilized in some previous systems, and the two valve control conduits are, of course, themselves controlled by suitable connections outside of the cooker and all four of these conduits are embodied in a plurality of one piece units, one for each mold. The conduit units are identical in structure so that there is no need for inserting the molds in the cooker in any particular order. The stacking of molds on the ram is no more difficult than the stacking of a plurality of molds containing the customary single connection or conduit.

It will, of course, be understood that various changes may be made in the form, details, arrangement and proportions of the various parts without departing from the scope of our invention.

What is claimed is:

1. Apparatus for vulcanizing vehicle tire casings and similar hollow rubber articles comprising, a cooker pot having a drain outlet therein, a plurality of casing molds in said pot, a fluid tight closure for said pot, a heated liquid inlet conduit extending into said cooker pot and having branches communicating with the interior of each of the tire casings in said molds, a drain conduit having branches communicating with the interior of each of said casings and having an outlet in communication with the drain outlet of said cooker pot and with normal pressure atmosphere, and valve means communicating with said drain conduit at its lower end and in the path of flow between said drain conduit and said cooker pot drain outlet.

2. The structure in claim 1, and valve control means located outside of said cooker pot.

3. The structure in claim 1, and fluid pressure means for operating said valve.

4. Apparatus for vulcanizing vehicle tire casings and similar hollow rubber articles comprising, a cooker pot, a plurality of casing molds in said pot, a fluid tight closure for said pot, a heated liquid inlet conduit extending into said cooker pot and having branches communicating with the interiors of each of the casings in said molds, a drain conduit closed at its upper end and having branches communicating with the interiors of each of said casings, said inlet and drain conduits being composed of detachably connected sections corresponding to the number of molds in said cooker pot, and a drain control valve connected with said drain conduit at the lower end thereof to provide a bottom drain therefor.

5. The structure in claim 4 and said valve being fluid operated, said sections including additional conduit portions independent of said inlet and drain conduits and adapted to supply fluid under pressure to said valve, and said valve control conduit being detachably connected to said valve.

6. Apparatus for vulcanizing vehicle tire casings and similar hollow rubber articles comprising a cooker pot, a vertically movable ram working in said cooker pot, a plurality of molds supported by said ram within said pot in stacked relationship, liquid inlet and drain conduits connected with each of said molds and made up of a plurality of sections corresponding in number to the number of molds, a drain conduit control valve supported on said ram, and said inlet and drain conduits being detachably connected to and supported by said control valve.

7. Apparatus for vulcanizing vehicle tire casings and similar hollow rubber articles comprising, a casing mold, means for supplying heated liquid to the interior of a casing within said mold, a drain conduit adapted to be connected to the interior of said casing, means for opening and closing said drain conduit, and an open conduit communicating with said drain conduit between said mold and said drain conduit opening and closing means, and being of materially less flow capacity than said liquid supply means to permit slow trickling of liquid from the interior of said casing to provide for constant circulation of fresh heated liquid through said casing.

8. Apparatus for vulcanizing vehicle tire casings and similar hollow rubber articles comprising, a cooker pot, a stack of casing molds in superposed relation to each other and removably positioned in said cooker pot, a plurality of detachably connected elements associated with said casing molds, each of said elements having a pair of conduits formed therethrough and said elements when connected together constituting heated liquid inlet and outlet conduits, means for supporting the lowermost of said stack of molds in said pot, said supporting means including means for closing the lower end of said inlet conduit, a closure for said cooker pot, a liquid supply line associated with said closure and adapted to be connected with the upper end of said inlet conduit, and means for closing the outlet conduit portion of the uppermost of said conduit elements at the upper end thereof.

9. Apparatus for vulcanizing vehicle tire casings and similar hollow rubber articles comprising, a cooker pot, a plurality of casing molds in said pot, a fluid tight closure for said pot, a heated liquid inlet conduit extending into said cooker pot and having branches communicating with the interior of each of the casings in said molds, a drain conduit having branches communicating with the interior of each of said casings, said inlet and drain conduits being composed of detachably connected sections corresponding to the number of molds in said cooker pot, a drain control valve connected with said drain conduit at the lower end thereof, valve control means extending outside of said cooker pot, and said drain valve and casing molds being movable in said cooker pot.

10. Apparatus for vulcanizing vehicle tire casings and similar hollow rubber articles comprising, a cooker pot, a plurality of casing molds in superposed relationship in said pot, a closure for said pot, a fluid inlet conduit portion communicating with the interiors of said molds, said inlet conduit portion being composed of a plurality of superposed detachable sections corresponding in number to said superposed molds, each section having a drain conduit portion formed therein, said inlet conduit portion having a supply line connected thereto and extending outside of said cooker pot, and a pressure device movable against the upper end of said superposed conduit sections to connect said inlet conduit portion with said supply line and to close the upper end of the uppermost of said superposed drain conduit portions.

DONALD BOYD.
HARRY E. FENNER.